United States Patent
Langford et al.

(10) Patent No.: US 6,671,144 B1
(45) Date of Patent: Dec. 30, 2003

(54) METHOD AND APPARATUS FOR DETECTING GROUND FAULTS AND FOR ISOLATING POWER SUPPLY FROM THE GROUND FAULTS

(75) Inventors: Joseph Andrew Langford, Duncanville, TX (US); Gregory Warren Osborne, Mansfield, TX (US)

(73) Assignee: Premier Aviation, Inc., Grand Prairie, TX (US)

( * ) Notice: Subject to any disclaimer, the term of this patent is extended or adjusted under 35 U.S.C. 154(b) by 348 days.

(21) Appl. No.: 09/603,069

(22) Filed: Jun. 26, 2000

(51) Int. Cl.[7] ................................................. H02H 3/00
(52) U.S. Cl. ........................................ 361/42; 361/93.1
(58) Field of Search ............................... 361/42–50, 78, 361/79, 93.1, 93.2, 93.5, 91.1; 324/509, 512, 520–522, 536, 76.41, 76.44; 702/58; 700/292, 293

(56) References Cited

U.S. PATENT DOCUMENTS

| | | | |
|---|---|---|---|
| 3,634,729 A | 1/1972 | Hendry | 361/96 |
| 3,766,435 A | 10/1973 | Childers | 361/92 |
| 3,968,410 A | 7/1976 | Graham | 361/96 |
| 3,992,650 A | 11/1976 | Iwasa et al. | 361/101 |
| 4,068,149 A | 1/1978 | Wuchinich | 315/200 A |
| 4,079,211 A | 3/1978 | Janssen | 379/442 |
| 4,121,122 A | 10/1978 | Pokrandt | 327/77 |
| 4,412,267 A | 10/1983 | Hansen | 361/94 |
| 4,580,186 A | 4/1986 | Parker et al. | 361/42 |
| 4,860,154 A | 8/1989 | Fazlollahi | 361/101 |
| 4,878,034 A | 10/1989 | Gross et al. | 330/298 |
| 4,947,278 A | 8/1990 | Nichols, III | 361/46 |
| 4,949,214 A * | 8/1990 | Spencer | 361/95 |
| 4,992,904 A | 2/1991 | Spencer et al. | 361/5 |
| 5,055,703 A | 10/1991 | Schornack | 307/64 |
| 5,237,480 A * | 8/1993 | Dara | 361/42 |
| 5,424,894 A | 6/1995 | Briscall et al. | 361/45 |
| 5,532,898 A | 7/1996 | Price | 361/119 |
| 5,576,615 A | 11/1996 | Marshall et al. | 323/284 |
| 5,606,482 A | 2/1997 | Witmer | 361/57 |
| 5,627,411 A | 5/1997 | Bochenek | 307/10.1 |
| 5,657,195 A | 8/1997 | Rault | 361/86 |
| 5,659,894 A | 8/1997 | Bayruns et al. | 455/323 |
| 5,691,869 A * | 11/1997 | Engel et al. | 361/42 |
| 5,825,602 A | 10/1998 | Tosaka et al. | 361/94 |
| 5,864,456 A | 1/1999 | Connor | 361/93.1 |
| 5,867,358 A | 2/1999 | Campbell | 361/47 |

(List continued on next page.)

FOREIGN PATENT DOCUMENTS

JP 54-147875 11/1979 ........... G01R/15/02

OTHER PUBLICATIONS

Quong, Resettable electronic fuse consists of SCR and relay; Sep. 15, 1977, Electronics, vol. 50, No. 19, p. 117.

*Primary Examiner*—Ronald W. Leja
(74) *Attorney, Agent, or Firm*—Pennie & Edmonds LLP

(57) ABSTRACT

The present invention is a method and apparatus for protecting a power supply from ground faults. The present invention operates substantially independently of the current drawn by the load. In addition, the present invention includes a time delay circuitry for preventing false detection of ground faults when the power source is connecting to the load. In a preferred embodiment, the apparatus of the present invention includes a control relay for connecting the power supply to the load. The apparatus also preferably includes a sensor diode for detecting ground faults and triggering the control relay to disconnect the power source from the ground fault as well as the load when a ground fault is detected. The apparatus also preferably includes a time delay relay to prevent false detection of ground faults by shielding the sensor diode from any current spikes that may occur when the power source is connecting to the load. Finally, the apparatus also preferably includes a fault protection condition indicator to indicate whether the circuit breaker circuitry is working properly.

27 Claims, 8 Drawing Sheets

U.S. PATENT DOCUMENTS

| | | | |
|---|---|---|---|
| 5,883,578 A | 3/1999 | Roberts et al. | 361/58 |
| 5,933,311 A | 8/1999 | Chen et al. | 361/106 |
| 5,946,179 A | 8/1999 | Fleege et al. | 361/93.1 |
| 5,986,860 A | 11/1999 | Scott | 361/42 |
| 5,999,384 A | 12/1999 | Chen et al. | 361/42 |
| 6,034,446 A | 3/2000 | Kowalski et al. | 307/112 |

\* cited by examiner

METHOD AND APPARATUS FOR DETECTING GROUND FAULTS AND FOR ISOLATING POWER SUPPLY FROM THE GROUND FAULTS

FIELD OF THE INVENTION

The present invention relates generally to a circuit breaker circuitry for protecting a power source from ground faults.

BACKGROUND OF THE INVENTION

Many devices known in the art are useful for protecting power sources from ground faults. Ground faults occur when grounded conductors come into contact with electrical circuitry, causing an excessive current flow in that circuitry. As a result, power supply can become overloaded, and the load that the power supply is meant to power ends up receiving little or no current at all.

The existing devices for protecting power sources from ground faults use thermal sensors, magnetic sensors, or current sensors to detect ground faults. For these devices, it is necessary to select and calibrate their sensors to accommodate the current drawn by the load for proper operation, making the existing fault protection devices load dependent. The process of selecting and calibrating particular sensors to the current drawn by the load is time consuming and expensive. Furthermore, these sensors must be recalibrated when the current drawn by the load changes significantly or if a different load is used.

Accordingly, there exists a need for a ground fault detection and protection device which operates independently of the load so that no calibration of the sensor is needed and is cost-effective to construct.

SUMMARY

The present invention relates to a circuit breaker circuitry for protecting a power source from ground faults. More specifically, the circuit breaker circuitry operates independently of the load to which the power source is connected. In addition, the preferred circuit breaker circuitry includes a time delay circuitry to prevent false detection of ground faults resulting from current spikes that may occur when the power supply connects to the load.

Preferably, the circuit breaker circuitry includes a control relay that connects a power source to its load. The control relay is powered by the power source through a circuit breaker so that, when the circuit breaker overloads and opens, the control relay loses power and severs the connection between the power source and the load.

Preferably, the circuit breaker circuitry also includes a sensor diode that detects ground faults by monitoring the voltage drop across the control relay. The sensor diode connects to the power supply side of the control relay through a time delay relay and the circuit breaker and connects directly to the load side of the control relay. When a ground fault occurs in the circuit, the ground fault draws a high current that causes the potential drop across the control relay to exceed the forward voltage of the sensor diode, activating the sensor diode. As a result, the sensor diode begins to conduct current through the circuit breaker, causing the circuit breaker to overload and open. Consequently, the control relay loses power and disconnects the power source from the load as well as the ground fault.

After removing the ground fault and manually resetting the circuit breaker, power returns to the control relay and the connection between the power source and the load is restored. However, the time delay relay delays the connection between the sensor diode and the power supply side of the control relay. This delay functions to shield the sensor diode from any current spikes that may occur when connecting the power source to the load so that no false detection of ground faults can occur.

Preferably, the circuit breaker circuitry also includes a fault protection condition indicator for indicating whether the circuit breaker circuitry is working properly.

DETAILED DESCRIPTION OF THE INVENTION

The present invention involves a circuit breaker circuitry that detects ground faults and isolates a power source from the ground fault. The disclosed circuit breaker circuitry operates independently of the load.

Figure 1:
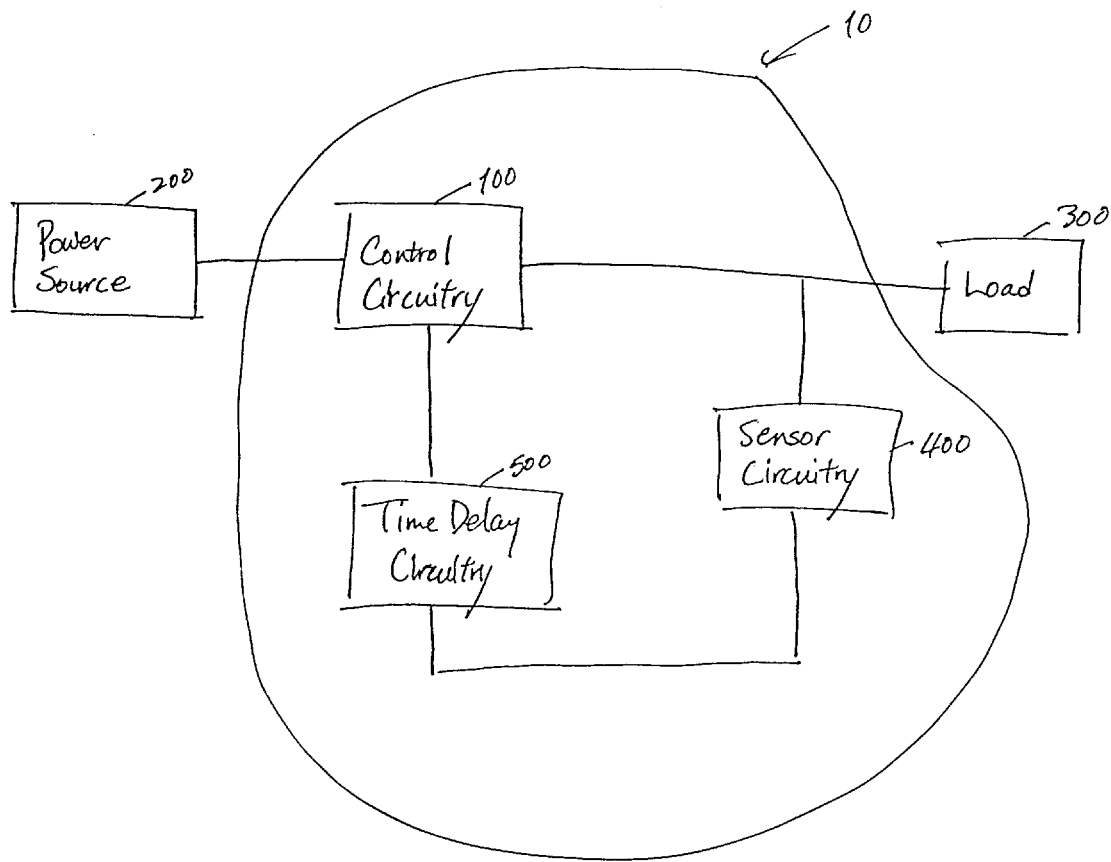
FIG. 1 depicts a block diagram of the present invention.

FIG. 1 illustrates the circuit breaker circuitry according to the present invention. It includes a control circuitry 100, a sensor circuitry 400, and a time delay circuitry 500. Control circuitry 100 connects power source 200 to load 300. Sensor circuitry 400 triggers control circuitry 100 to isolate power source 200 from circuit breaker 25 circuitry 10 when sensor circuitry 400 detects a ground fault. When the ground fault is removed and the control circuitry 100 is reset, control circuitry 100 reconnects power source 200 to circuit breaker circuitry 10. While control circuitry 100 is being reset or when control circuitry 100 initially connects power source 200 to its load, a current spike may occur as a result of connecting load 300 to power source 200. Time delay circuitry 500 operates to isolate sensor circuitry 400 from the current spike so as to prevent false ground fault detection. Control circuitry 100, sensor circuitry 400, and time delay circuitry 500 interact in such a way that circuit breaker circuitry 10 operates independently of load 300, as will be illustrated by the preferred embodiment below.

Figure 2:
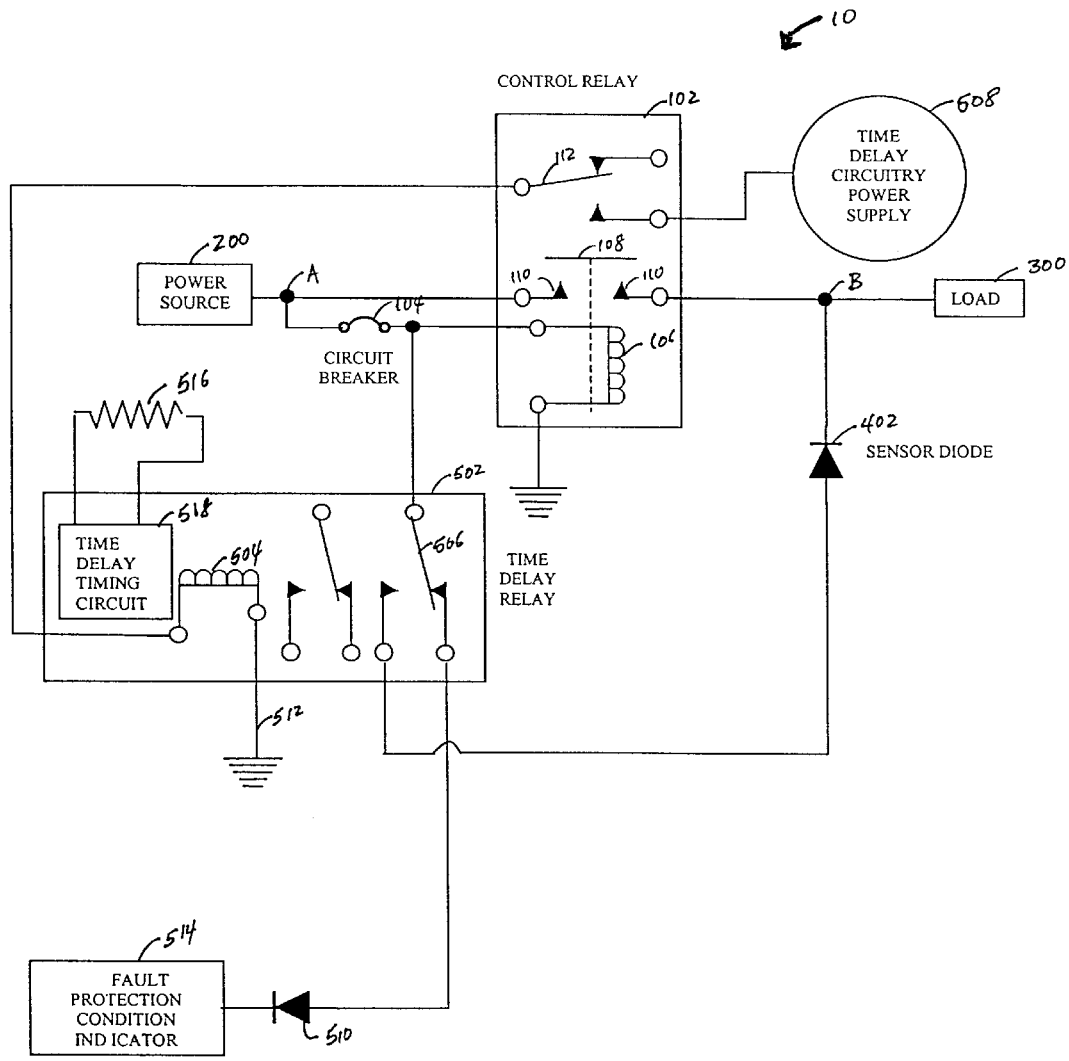
FIG. 2 depicts a schematic of a preferred embodiment according to the present invention with power switching time delay relay.

A preferred embodiment according to the present invention is shown in FIG. 2. In the preferred embodiment, control circuitry 100 includes a control relay 102 and a circuit breaker 104. Although various relays and circuit breakers may be used, the preferred control relay 102 and circuit breaker 104 are the Cutler Hammer SM150D2 relay and the Klixon 7277-2-1/2 circuit breaker respectively. Control relay 102 includes a control coil 106, a control armature 108, resistive contacts 110, and a time delay circuitry switch 112. Control armature 108 connects power source 200 to load 300 when it engages resistive contacts 110. Although biased away from resistive contacts 110, control armature 108 engages resistive contacts 110 when control coil 106 creates a magnetic field that pulls control armature 108 to resistive contacts 110. Similarly, time delay switch 112, which is biased to engage an open circuit, connects to time delay circuitry power supply 508 when control coil 106's magnetic field pulls time delay switch 112 to time delay circuitry power supply 508, powering time delay relay 502. Circuit breaker 104 connects power source 200 to control coil 106 to supply control coil 106 with the necessary current to create its magnetic field. Circuit breaker 104 also connects power source 200 to time delay relay 502 and sensor diode 402.

Sensor circuitry 400 (see FIG. 1) includes a sensor diode 402 (see FIG. 2) that monitors the voltage drop across control relay 102 at points A and B. Although various diodes may be used, a preferred sensor diode 402 is the Motorola 1N4005 diode. Sensor diode 402 connects to point A on one terminal via sensor circuitry switch 506 and circuit breaker 104. Sensor diode 402 connects to point B directly on the other terminal. Sensor diode 402 is biased to allow current to flow from point A to point B, but it will only allow current to flow through when the voltage drop across control relay 102 is greater than sensor diode 402's forward voltage, typically 0.6 volts. Since resistive contacts 110 have very low resistance, the voltage drop across control relay 102 exceeds sensor diode 402's forward voltage only when a high current is drawn from power source 200, which occurs when there is a ground fault. When sensor diode 402 allows current to flow through it, that same current flows through circuit breaker 104, causing circuit breaker 104 to overload and become an open circuit.

Also shown in FIG. 2, time delay circuitry 500 (see FIG. 1) includes a time delay relay 502, a time delay circuitry power supply 508, a fault protection diode 510, and a fault protection condition indicator 514. Although various time delay relay may be used, the preferred time delay relay 502 is the NCC L1F-00010-562 time delay relay. Time delay relay 502 includes a timing resistor 516, a timing circuit 518, a time delay coil 504, and a sensor circuitry switch 506. Timing resistor 516 and timing circuit 518 operate together to delay switching of sensor circuitry switch 506 when time delay relay 502 is activated. The resistance value of timing resistor 516 determines the length of the time delay. In the NCC L1F-00010-562 time delay relay, the period of time delay may be varied from 10 ms to 10 s.

Sensor circuitry switch 506 connects sensor diode 402 to circuit breaker 104 when sensor circuitry switch 506 engages sensor diode 402. Although biased to connect to fault protection diode 510, sensor circuitry switch 506 connects to sensor diode 402 under the force of the magnetic field created by time delay coil 504. Time delay circuitry power supply 508, which is connected to control relay 102, provides time delay coil 504 with the necessary current to generate its magnetic field. Fault protection diode 510 is biased to conduct current from the power source 200 to fault protection indicator 514.

In operation, the preferred embodiment of FIG. 2 functions as follows. When no ground fault is detected, control armature 108, which is in engagement with resistive contacts 110 under the force of control coil 106's magnetic field, connects power source 200 to load 300. Power source 200 supplies the necessary current via circuit breaker 104 to the control coil 106 for generating the magnetic field. Control coil 106's magnetic field also engages time delay circuit switch 112 with time delay relay power supply 508, supplying power to time delay relay 502.

Sensor diode 402 monitors the voltage drop across control relay 102 via points A and B. Sensor diode 402 is in voltage contact with point A on one terminal via sensory circuitry switch 506 and circuit breaker 104 and is directly connected to point B on the other terminal. Sensor circuitry switch 506 is held in contact with sensor diode 402 by time delay coil 504's magnetic field. Time delay circuitry power supply 508 provides the necessary current to time delay coil 504 via time delay circuit switch 112 to generate the magnetic field.

The voltage drop across points A and B is caused by resistive contacts 110 of control relay 102. Normally, load 300 does not draw enough current from power source 200 to cause enough voltage drop across points A and B to activate sensor diode 402, which typically requires a forward voltage of 0.6 volts for activation. However, when a ground fault occurs, the ground fault draws a high quantity of current from power source 200, causing the voltage drop across resistive contacts 110 and, consequently, the voltage drop across points A and B to exceed the forward voltage of sensor diode 402. In alternate embodiments, sensor diode 402 can be made more sensitive to current drawn by a ground fault by using a diode with a lower forward voltage rating. Sensor diode 402 can also be made more sensitive to current drawn by a ground fault by placing a shunt resistor in series with resistive contacts 110 between points A and B so as to raise the potential drop across points A and B. As a result of exceeding it forward voltage, sensor diode 402 becomes active and begins to conduct current from power source 200 to the ground fault through circuit breaker 104.

Circuit breaker 104 responds to the surge in current by opening the circuit, disconnecting power source 200 from control coil 106. Without current from power source 200, control coil 106 loses its magnetic field, releasing control armature 108 from resistive contacts 110. As a result, power source 200 is isolated from the ground fault as well as most of the circuit breaker circuitry 10. The loss of magnetic field in the control relay 102 also releases time delay circuitry switch 112 disconnecting time delay relay 502 from time delay circuitry power supply 508. Consequently, time delay coil 504 also loses its magnetic field, disconnecting sensor circuitry switch 506 from sensor diode 402.

At this point, power source 200 is isolated from the ground fault and time delay relay 502 is without power. In order to reactivate the circuit breaker circuitry 10 and allow current to again flow from power source 200 to load 300, the ground fault needs to be removed and the circuit breaker 104 needs to be manually reset.

After circuit breaker 104 is manually reset, power source 200 restores current to control coil 106, generating a magnetic field in control relay 102. The magnetic field engages control armature 108 and time delay circuit switch 112 to resistive contacts 110 and time delay circuitry power supply 508 respectively. As a result, power source 200 is again connected to load 300 and time delay relay 502 is activated.

Figure 3:
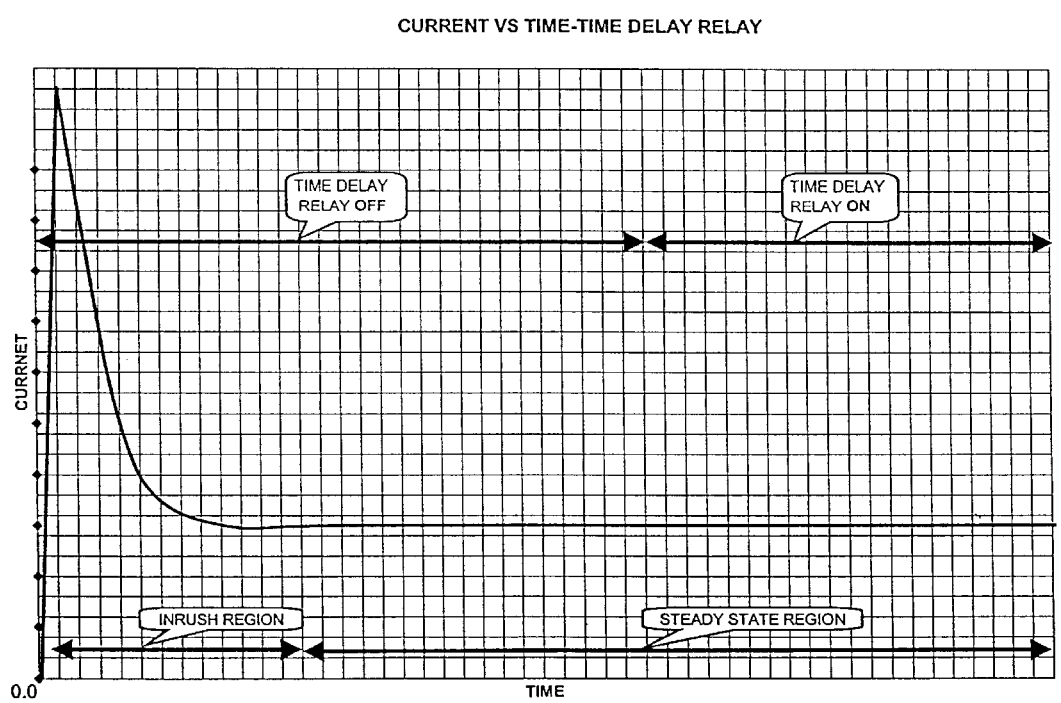
FIG. 3 depicts the temporal relationship between a current spike caused by connection of power supply to its load as compared to time delay caused by time delay circuitry.

When control armature 108 connects power source 200 to load 300, a current spike may occur which results in a temporary high potential drop across points A and B that may falsely activate sensor diode 402. Time delay relay 502 functions to isolate sensor diode 402 from effects of the current spike by connecting sensor diode 402 to point A only after enough time has passed for the current spike to subside. The period of time delay is determined by timing resistor 516 and timing circuit 518. FIG. 3 illustrates the current spike as a function of time in relation to the time delay created by time delay relay 502.

If, during the process of resetting circuit breaker circuitry 10, sensor circuitry switch 506 fails to engage the sensor diode 402, fault protection diode 510 is activated, conducting current from the power source 200 to the fault protection condition indicator 514. Fault protection condition indicator 514 then warns of improper resetting of the circuit breaker circuitry 10. If, however, sensor circuitry switch 506 properly connects to sensor diode 402, circuit breaker circuitry 10 resumes normal conditions, where control relay 102 connects power source 200 to the load 300 and sensor diode 402 monitors the voltage drop across points A and B.

Figure 4:
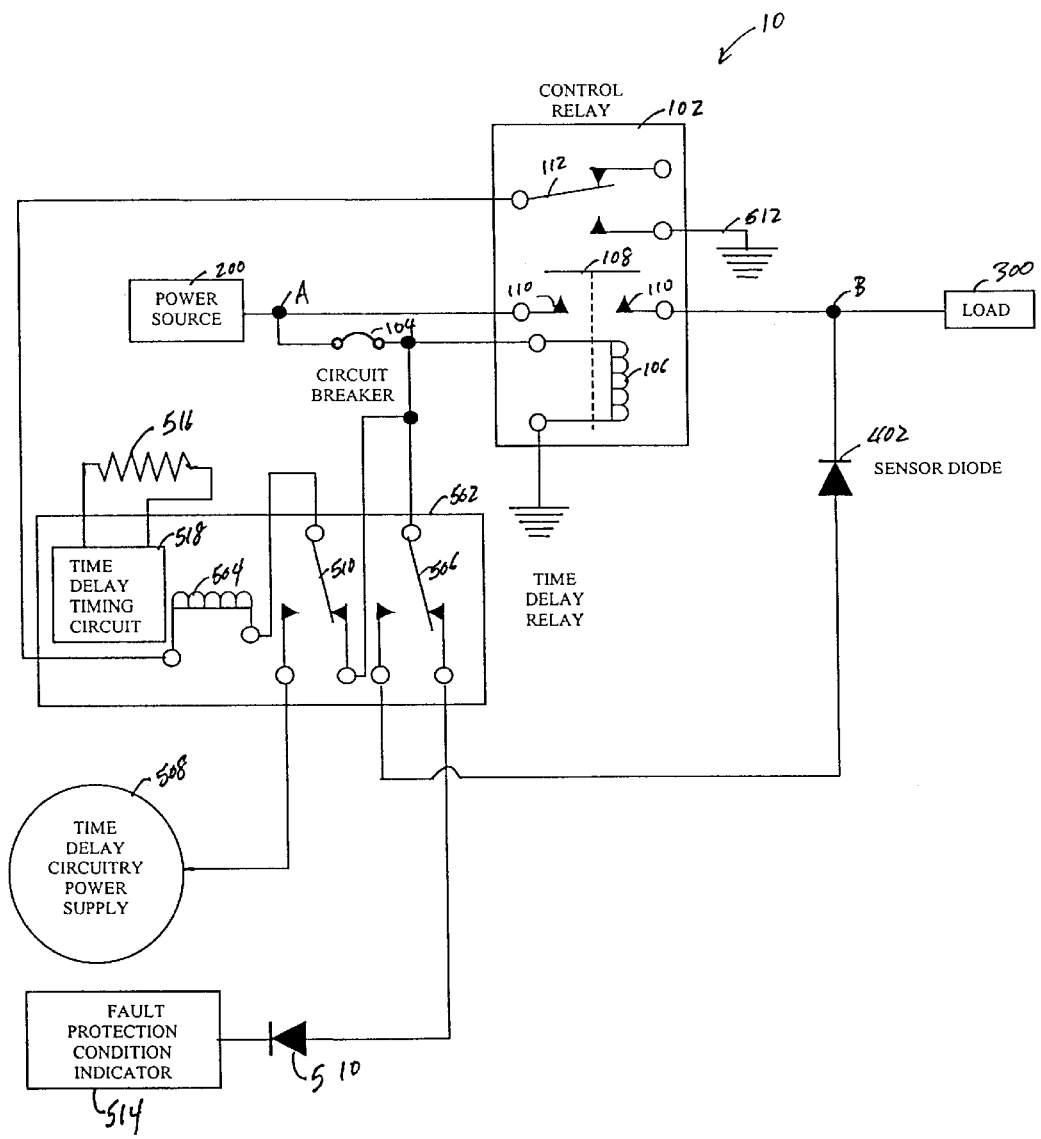
FIG. 4 depicts a detailed schematic of the alternate embodiment according to the present invention with ground switching time delay relay.

In an alternate preferred embodiment illustrated in FIG. 4, time delay relay 502 can be ground switching rather than power switching, as was described above. In the ground switching embodiment, time delay circuitry power supply 508 connects to time delay relay coil 504 via time delay coil switch 510, and ground 512 is connected to control relay 102.

Operation of the alternate preferred embodiment depicted in FIG. 4 is similar to the operation of the preferred embodiment of FIG. 2. They differ only in the following two ways. First, when circuit breaker 104 becomes an open circuit in response to a ground fault and, consequently, control coil 106 loses its magnetic field, time delay switch 112 switches from ground 512 to an open circuit rather than from the time delay circuitry power supply 508 to open circuit as is done in the power switching relay embodiment above. Second, when circuit breaker 104 is manually reset, time delay relay 502 initially draws current from power source 200 rather than from time delay circuitry power supply 508 as is done in the power switching relay embodiment above. Only after the time delay caused by timing resistor 516 and timing circuit 518 does time delay coil 504 generate a magnetic field to pull time delay coil switch 510 to engage time delay circuitry power supply 508, powering time delay relay 502 in steady state.

Figure 5:
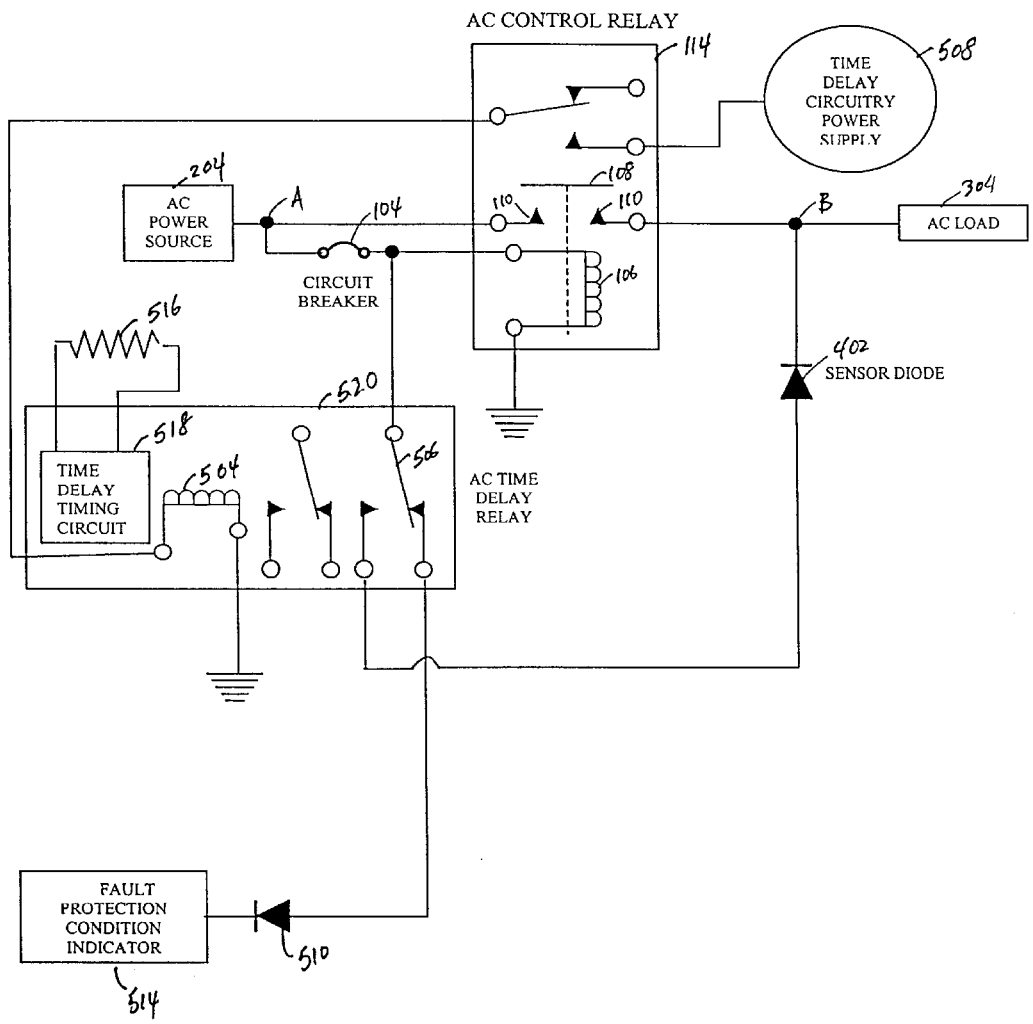
FIG. 5 depicts a schematic of the preferred embodiment according to the present invention which works with AC signals.

The preferred embodiment can also be modified to operate with AC signals. One such embodiment is shown in FIG. 5. The preferred circuitry depicted in FIG. 5 is similar to the one depicted in FIG. 2; the differences exist only in components used. Specifically, relays 114 and 520 are AC relays rather than DC relays so that no chattering occurs when handling AC signals. In addition, power source is an AC power source 204, and the load is an AC load 304.

Figure 6:
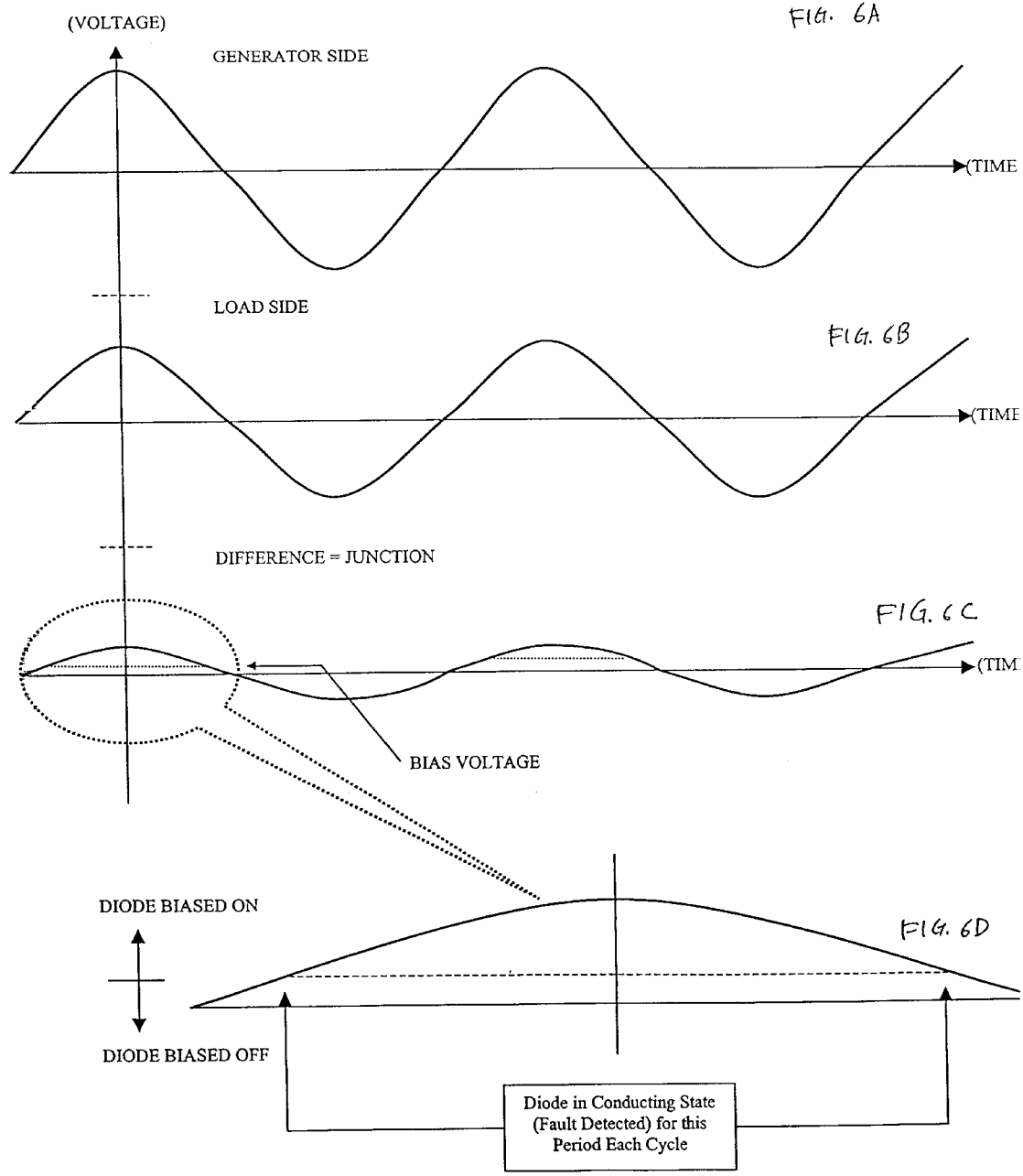
FIG. 6A depicts an AC signal from a AC generator.
FIG. 6B depicts the AC signal of FIG. 6A after the signal passes through the control relay.
FIG. 6C depicts the difference in AC signals of FIG. 6A and FIG. 6B.
FIG. 6D depicts the AC signal of FIG. 6C in further detail.

Operationally, the AC embodiment of FIG. 5 functions similarly to the DC embodiment of FIG. 2. The only difference is that an AC power source 204 powers control coil 106 and an AC signal activates sensor diode 402. FIG. 6A depicts the AC signal seen at point A, which is the signal from of AC power source 204. FIG. 6B depicts the signal seen at point B, which is the AC signal seen at point A reduced by voltage drop across resistive contacts 110. FIG. 6C depicts the difference between the two AC signals. If a ground fault occurs, the voltage difference between points A and B becomes large enough to activate sensor diode 402. This condition is depicted in FIG. 6D, where the positive peak of the AC signal exceeds the forward voltage of sensor diode 402, causing the sensor diode 402 to activate and conduct current through circuit breaker 104. Consequently, circuit breaker 104 becomes an open circuit.

Figure 7:
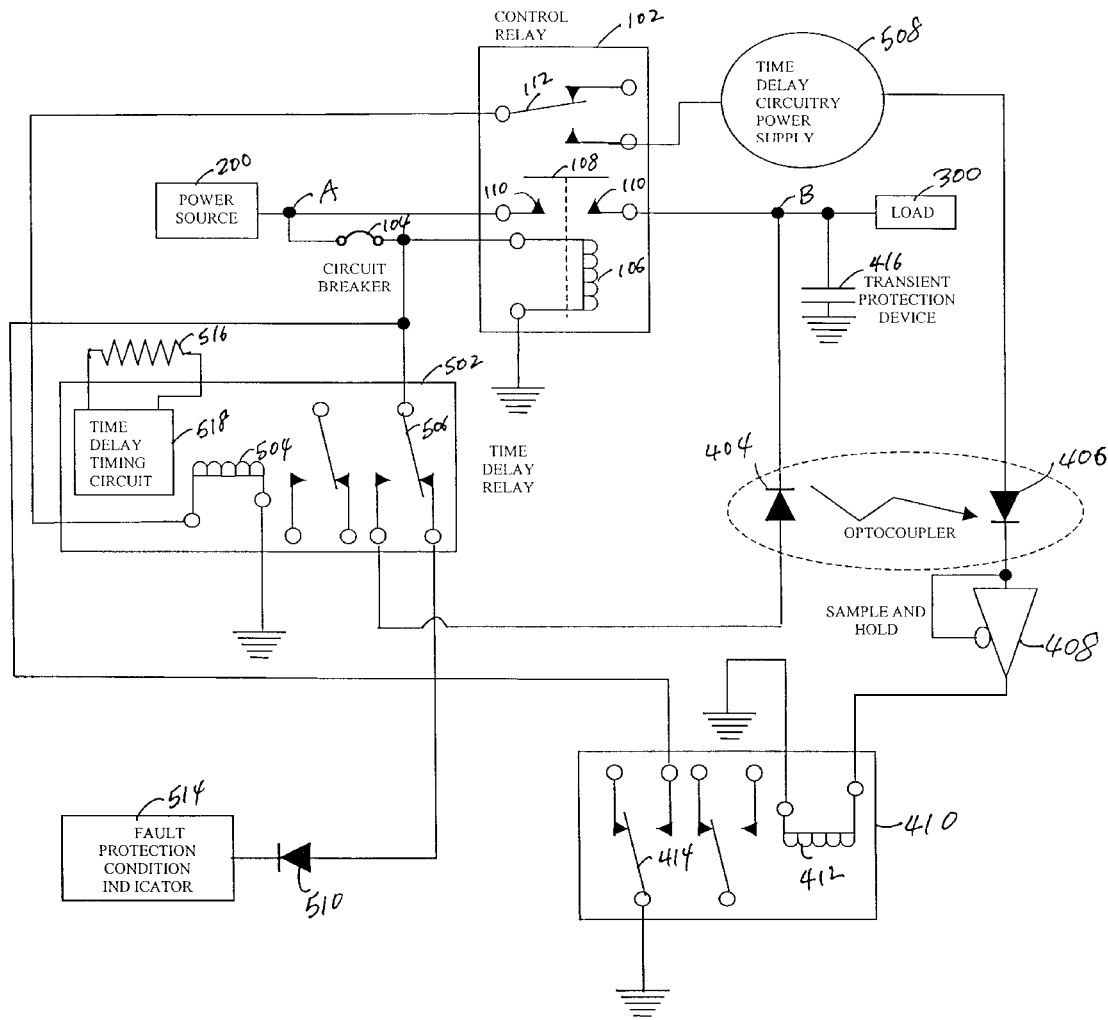
FIG. 7 depicts a schematic of the preferred embodiment according to the present invention that protects against arcing and transient faults as well as ground faults.

In yet another alternate embodiment, the preferred embodiment can be modified to protect power source 200 from transient or arching faults in addition to ground faults. One such embodiment is shown in FIG. 7. The circuitry depicted in FIG. 7 is similar to one depicted in FIG. 2; the difference is that sensor circuitry 400 (see FIG. 1) is modified to detect transient and arcing faults in addition to ground faults. The modified sensor circuitry 400 (see FIG. 1) includes a optocoupler emitting diode 404, optocoupler detecting diode 406, a sample and hold circuitry 408, a sensor circuitry relay 410 and a transient protection device 416. Sensor circuitry relay 410 includes a sensor circuitry coil 412 and a circuit breaker switch 414.

Optocoupler emitting diode 404 takes the place of sensor diode 402 of the circuitry depicted in FIG. 2. When activated, optocoupler emitting diode 404 emits a light which optocoupler detector diode 406 detects. Optocoupler detecting diode 406 connects to time delay circuitry power supply 508 on one terminal and connects to sample and hold circuitry 408 on the other terminal. Sample and hold circuitry 408 samples signals from optocoupler detecting diode 406 and outputs the sampled signal in a sustained form. Sample and hold circuitry 408's output is connected to sensor circuitry relay 410 through sensor circuitry coil 412. Sample circuitry relay 410 connects to circuit breaker 104 through circuit breaker switch 414. Transient protection device 416, which may be a capacitor, a spark gap, or a solid state device such as a metal oxide varistor, connects to load 300.

In operation, when a transient or arcing fault occurs, transient protection device 416 shorts the transient or arcing fault to the ground, causing a short burst of current to flow through resistive contacts 110 of control relay 102. This creates a temporary voltage drop across points A and B, activating optocoupler emitting diode 404 for a short period of time which is not long enough to overload circuit breaker 104. However, optocoupler emitting diode 404 emits radiation during that short period when it is activated. Optocoupler detecting diode 406 captures this brief burst of radiation from optocoupler emitting diode 404 and sends a brief signal to sample and hold circuitry 408 in response. Sample and hold circuitry 408 samples the brief signal from optocoupler detecting diode 406 and sends a sustained signal to sensor circuit relay 410. The sustained signal causes current to flow through sensor circuitry coil 412 resulting in creation of a magnetic field. The magnetic field pulls circuit breaker switch 414 to engaged circuit breaker 104, grounding circuit breaker 104. At this point, current begins to flow from power source 200 through circuit breaker 104 and circuit breaker switch 414 to ground until circuit breaker 104 overloads and opens, setting off a series of events described above in connection to the operation of the circuitry depicted in FIG. 2 that result in isolating power source 200 from further transient or arcing faults. When resetting circuit breaker 104 to reconnect power source 200 to load 300, sample and hold circuitry 408 is also reset to output zero current to eliminate magnetic field generated by sensor circuitry coil 412, releasing circuit breaker switch 414.

Importantly, circuit breaker circuitry 10 of the disclosed embodiments operates independently of load 300; that is, nothing in circuit breaker circuitry 10 is required to be calibrated to a particular load 300 in order for proper operation. The reason is that, in a typical relay, resistive contacts 110 have resistance on the order of 0.0003 Ohms. In order to activate sensor diode 402, which typically requires a forward voltage of 0.6 volts, the current drawn would have to be on the order of 2000 Amps. Even with power source 200 supplying a high voltage of about 200 volts, any mechanism that can activate sensor diode would have to have less than 0.1 Ohms resistance. Since most load 300 would have much larger resistance than 0.1 Ohms, voltage drop across points A and B caused by load 300 is negligible to sensor diode 400 such that, without having to specially calibrate a typical relay or diode, circuit breaker circuitry 10 can be connected to most any load 300 and operate properly.

Figure 8:
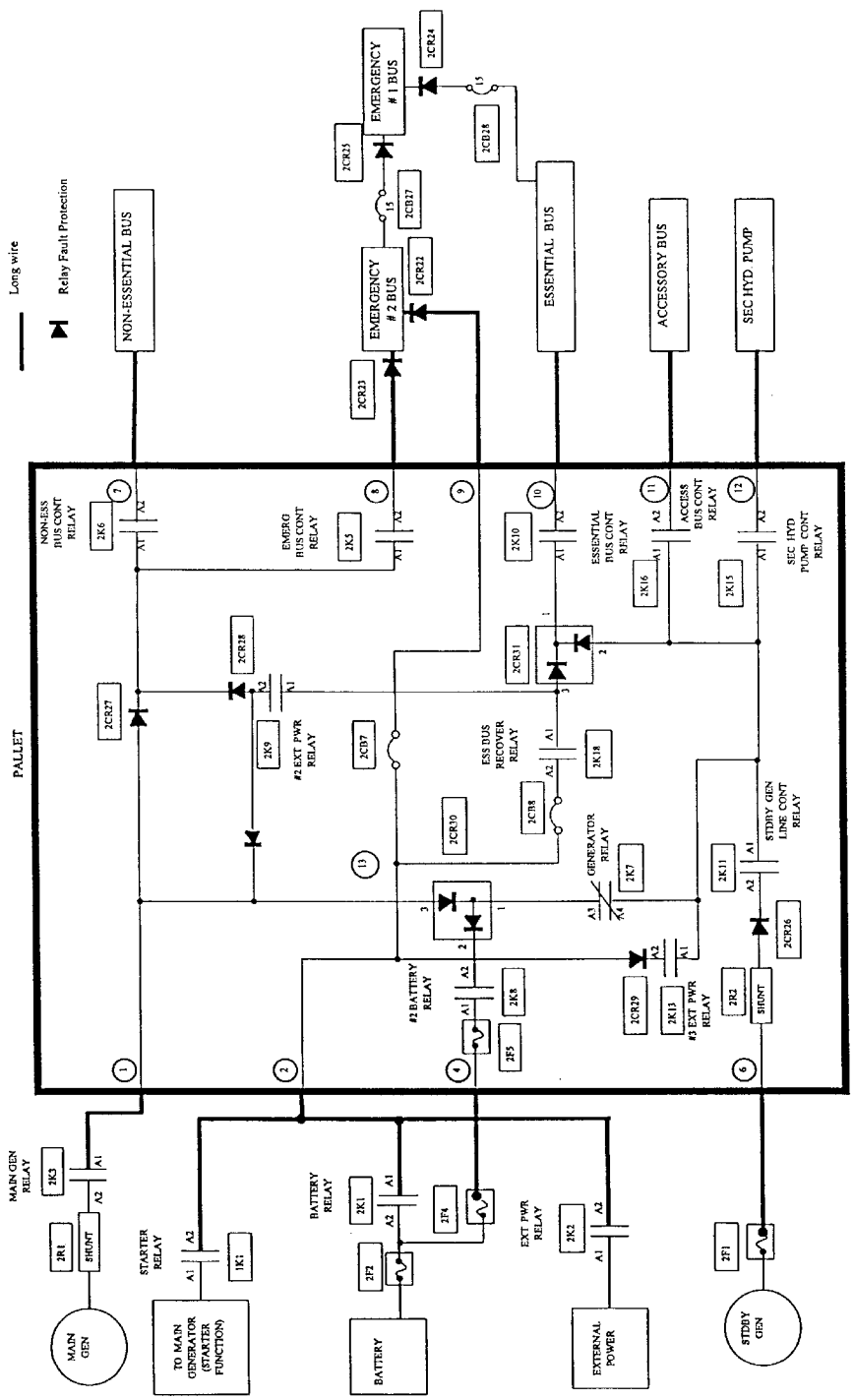
FIG. 8 depicts a schematic of a circuitry for powering various parts of a helicopter that uses the preferred embodiment for protection against ground faults.

Circuit breaker circuitry 10 as described above may be integrated into the circuit depicted in FIG. 8 which is used for powering various parts of a helicopter. Circuit breaker circuitry 10 are designated by 2K6, 2K5, 2K10, 2K16, and 2K15 in the schematic. These circuit breaker circuitries act to protect power sources from ground faults. It should be noted that circuit breaker circuitry 10 can also be employed in circuits powering various parts of an airplane or any other types of aircraft.

The disclosed embodiments can be modified by a person skilled in the art without deviating from the scope of the present invention. For example, time delay relay 502 may be replaced with a logic circuit that can isolate sensor diode 402 from current spikes which may occur when connecting power source 200 to load 300. In addition, sensor diode 402 may also be replace with a logic circuit that conducts current from power source 200 to a ground fault in response to a large voltage drop across points A and B. Other modifications are also possible as by a person skilled in the art.

While the invention has been described in conjunction with specific embodiments, it is evident that numerous alternatives, modifications, and variations will be apparent to those skilled in the art in the light of forgoing descriptions. The scope of this invention is defined only by the following claims.

What is claimed is:

1. Circuit breaker circuitry comprising:
   control circuitry that connects a power source to a load, the control circuitry comprising
      a circuit breaker;
      a control relay connected to the circuit breaker, the control relay comprising
         resistive contacts,
         a control armature biased away from the resistive contacts for conducting current from the power source to the load when the control armature is in engagement with the resistive contacts, and
      a time delay circuitry switch; and
      a control coil connected to the circuit breaker;
      wherein the circuit breaker connects the control coil to the power source thereby supplying current to the control coil to generate a magnetic field, and
      wherein the magnetic field from the control coil creates a magnetic force to engage the control armature with the resistive contacts and the resistive contacts create a potential drop across the control relay;
   sensor circuitry that detects ground faults; and
   time delay circuitry that delays connection of the sensor circuitry to the control circuitry to prevent false detection of ground faults;
   wherein the time delay circuitry switch is connected to the time delay circuitry and switches the time delay circuitry on and off.

2. The circuit breaker circuitry according to claim 1, wherein the circuit breaker becomes an open circuit when the sensor circuitry detects a ground fault.

3. The circuit breaker circuitry according to claim 2, wherein the open circuit disconnects the control coil from the power source.

4. The circuit breaker circuitry according to claim 3, wherein the disconnection of the control coil from the power source causes a loss of control coil's magnetic field, releasing the control armature from the resistive contacts.

5. The circuit breaker circuitry according to claim 4, wherein release of the control armature from the resistive contacts disconnects the power source from the load and the ground fault.

6. Circuit breaker circuitry comprising:
   control circuitry that connects a power source to a load;
   sensor circuitry that detects ground faults, the sensor circuitry comprising a diode for monitoring a potential difference across the control circuitry, and
   time delay circuitry that delays connection of the sensor circuitry to the control circuitry to prevent false detection of ground faults.

7. The circuit breaker circuitry according to claim 6, wherein the diode is biased to allow current to flow from the power source side of the control circuitry to the load side of the control circuitry.

8. Circuit breaker circuitry comprising:
   control circuitry that connects a power source to a load;
   sensor circuitry that detects ground faults;
   time delay circuitry that delays connection of the sensor circuitry to the control circuitry to prevent false detection of ground faults; and
   wherein the time delay circuitry comprises a time delay relay.

9. The circuit breaker circuitry according to claim 8, wherein the time delay circuitry further comprises a time delay power supply that powers the time delay relay.

10. The circuit breaker circuitry according to claim 9, wherein the time delay relay comprises a time resistor and a timing circuit that determines the length of time delay for connecting the sensor circuitry to the control circuitry when the control circuitry is reset.

11. The circuit breaker circuitry according to claim 10, wherein the time delay relay further comprises a time delay coil that generates a magnetic field.

12. The circuit breaker circuitry according to claim 11, wherein the time delay relay further comprises a sensor circuitry switch that connects and disconnects the sensor circuitry to the control circuitry.

13. The circuit breaker circuitry according to claim 12, wherein the sensor circuitry switch is biased to disconnect from the sensor circuitry.

14. The circuit breaker circuitry according to claim 13, wherein the magnetic field pulls the sensor circuitry switch closed thereby connecting the sensor circuitry to the control circuitry.

15. Circuit breaker circuitry comprising:
   (a) control circuitry that connects a power supply with a load;
   (b) sensor circuitry that detects ground faults; and
   (c) time delay circuitry that shields the sensor circuitry from current spikes generated by the power supply when the power supply is connecting to the load, the time delay circuitry comprising a time delay relay.

16. A method for protecting a power source from a ground fault, comprising:
   detecting the ground fault by monitoring a voltage drop across a control relay using a diode; and
   isolating the power source from the ground fault when the ground fault is detected.

17. Circuit breaker circuitry that detects and isolates electrical faults comprising:
(a) control circuitry that connects a power supply with a load;
(b) sensor circuitry that detects one or more of arcing, transient, and ground faults, the sensor circuitry comprising:
an optocoupler emitting diode that emits radiation when activated,
an optocoupler detecting diode that detects radiation emitted from the optocoupler emitting diode, and
sample and hold circuitry that samples signals from the optocoupler detecting diode; and
(c) time delay circuitry that shields the sensor circuitry from current spikes generated by the power supply when the power supply is connecting to the load.

18. The circuit breaker circuitry according to claim 17, wherein the sensor circuitry further comprises a sensor circuitry relay that receives an output from the sample and hold circuitry.

19. The circuit breaker circuitry according to claim 18, wherein the sensor circuitry relay is connected to a circuit breaker.

20. The circuit breaker circuitry according to claim 19, wherein the sensor circuitry relay overloads the circuit breaker when the sample and hold circuitry outputs a sustained signal.

21. The circuit breaker circuitry according to claim 20, wherein the sample and hold circuitry outputs a sustained signal when it samples a signal from the optocoupler detecting diode.

22. The circuit breaker circuitry according to claim 21, wherein the optocoupler detecting diode outputs a signal when it detects radiation emitted from the optocoupler emitting diode.

23. The circuit breaker circuitry according to claim 22, wherein the optocoupler emitting diode emits radiation when an arcing fault occurs.

24. The circuit breaker circuitry according to claim 22, wherein the optocoupler emitting diode emits radiation when a transient fault occurs.

25. Circuit breaker circuitry that detects and isolates electrical faults comprising:
(a) control circuitry that connects a power supply with a load;
(b) sensor circuitry that detects one or more of arcing, transient, and ground faults; and
(c) time delay circuitry that shields the sensor circuitry from current spikes generated by the power supply when the power supply is connecting to the load;
wherein the time delay circuitry comprises a time delay relay.

26. Circuit breaker circuitry that detects and isolates electrical faults comprising:
(a) control circuitry that connects a power supply with a load;
(b) sensor circuitry that detects one or more of arcing, transient, and ground faults;
(c) time delay circuitry that shields the sensor circuitry from current spikes generated by the power supply when the power supply is connecting to the load; and
(d) a transient protection device that connects an arcing fault directly to ground.

27. Circuit breaker circuitry that detects and isolates electrical faults comprising:
(a) control circuitry that connects a power supply with a load;
(b) sensor circuitry that detects one or more of arcing, transient, and ground faults;
(c) time delay circuitry that shields the sensor circuitry from current spikes generated by the power supply when the power supply is connecting to the load; and
(d) a transient protection device that connects a transient fault directly to ground.

* * * * *